United States Patent [19]

Hara

[11] 4,376,466

[45] Mar. 15, 1983

[54] FIRE EXTINGUISHING APPARATUS FOR AIRDROPPING A FIRE-EXTINGUISHING AGENT

[75] Inventor: Hidetada Hara, Yokohama, Japan

[73] Assignee: Takashima & Co., Ltd., Tokyo, Japan

[21] Appl. No.: 250,078

[22] Filed: Apr. 1, 1981

[51] Int. Cl.³ .............................................. A62C 25/00
[52] U.S. Cl. .................................... 169/53; 239/171; 403/349
[58] Field of Search ...................... 169/53, 54, 51, 52, 169/66; 239/171; 150/49, 1; 222/92, 105; 403/348, 349; 244/136; 248/558, 165, 354 R; 285/402, 401, 33

[56] References Cited

U.S. PATENT DOCUMENTS

| 1,069,146 | 8/1913 | Kennedy | 403/349 |
| 2,862,738 | 12/1958 | Bayley | 403/349 |
| 3,688,952 | 9/1972 | Barlow et al. | 239/171 |

FOREIGN PATENT DOCUMENTS 1,061,075  3/1967  United Kingdom ................. 169/53

Primary Examiner—Joseph J. Rolla
Assistant Examiner—Kenneth Noland
Attorney, Agent, or Firm—Oblon, Fisher, Spivak, McClelland & Maier

[57] ABSTRACT

Disclosed is a fire extinguishing apparatus for airdropping a fire-extinguishing agent which comprises a flexible tank containing the fire-extinguishing agent, a base section attached to the lower portion of the tank and including a valve for discharging the fire-extinguishing agent, a head block attached to the upper end of the tank, whereby the whole body of the apparatus is suspended, and a support with its upper and lower ends coupled to the head block and the base section, respectively. In this apparatus, the coupling between the base section and the support is achieved by way of a bayonet coupling system using upper and lower coupling members attached respectively to the base section and the support. When the coupling between the two coupling members is completed, a coupling retaining member slidably fitted in the support engages both these coupling members to lock the coupling between them.

5 Claims, 9 Drawing Figures

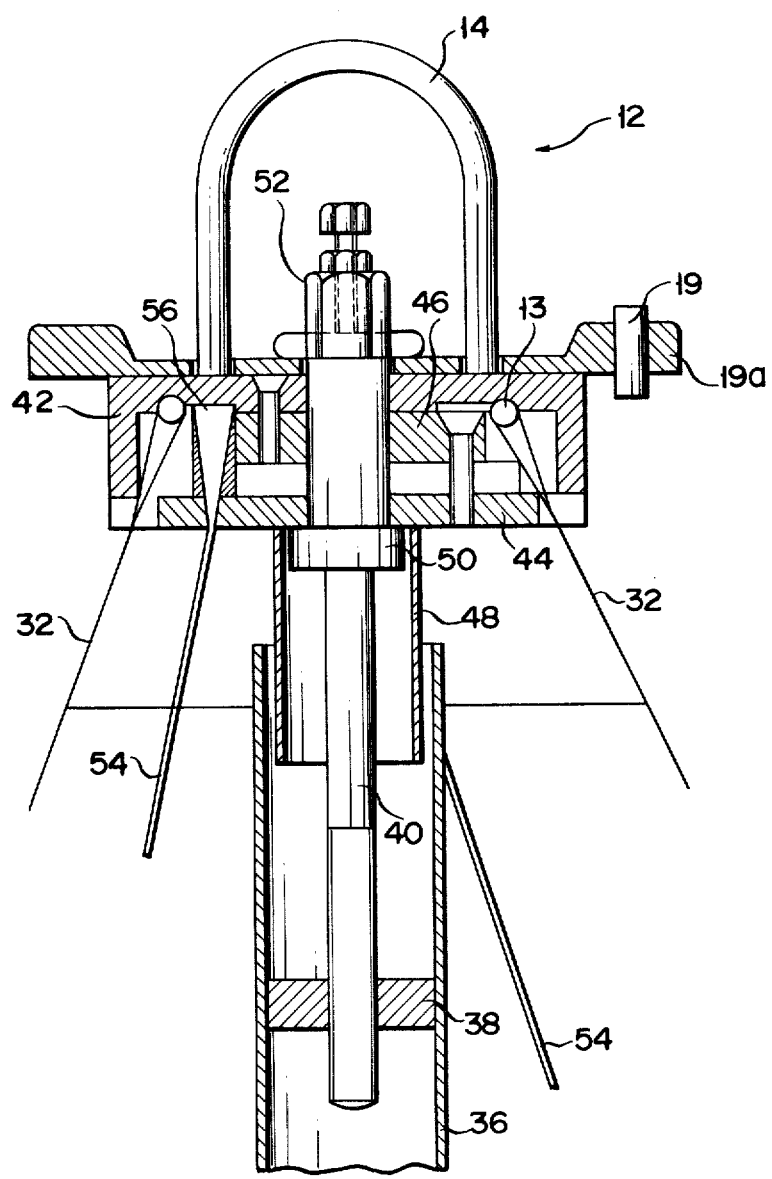

FIRE EXTINGUISHING APPARATUS FOR AIRDROPPING A FIRE-EXTINGUISHING AGENT

This invention relates to a fire extinguishing apparatus containing a fire-extinguishing agent and airdropping the agent onto the scene of a fire to which it is carried.

Already developed and used effectively, the fire extinguishing apparatus of this type is less than perfect. First, it takes much time to attach or detach a coupling mechanism for fitting a base section of the apparatus with a support which couples the base section with a head block of the apparatus. Such coupling mechanism should be considered to be unsuited for quick assembly of the apparatus. The base section is a member which is attached to the lower portion of a tank containing a fire-extinguishing agent and is provided with a valve which is opened when the agent is airdropped. The head block is coupled to the upper end portion of the tank, and is suspended from a transport means such as a helicopter with the aid of a hanger ring attached to the head block. In this manner, the apparatus is carried to the scene of a fire.

Made of a flexible material, the tank, when injected with the fire-extinguishing agent, will fail to enjoy uniformity in shape unless the base section and the head block are coupled by means of a suitable member to provide a given length for them. In order to avoid such awkwardness, the aforesaid support is used to arrange the base section and the head block at a given space from each other. The support is a member in the form of a pipe, and the coupling between the support and the base section is usually obtained by inserting a projection formed on the base section into the lower end portion of the support and fixing them by means of a pin. In coupling the base section and the support, therefore, it is necessary to align their respective pin holes and to drive the pin into these pin holes. In folding up the tank after use, there are required many working processes, such as removal and storage of the pin driven in the pin holes, etc. Moreover, both the coupling and removal require much time and several workers.

The object of this invention is to provide a fire extinguishing apparatus for airdropping a fire-extinguishing agent, capable of quick and easy coupling of a support and a base section and so designed that such coupling cannot unexpectedly be released.

To this end, the apparatus of this invention uses an improved bayonet coupling system for the coupling between the support and the base section. That is, according to the invention, a bayonet-type upper coupling member is attached to the lower end of the support, while a bayonet-type lower coupling member is attached to the base section. The upper coupling member has a plurality of tooth portions protruding outward from a rod member, and the lower coupling member has a plurality of tooth portions protruding inward from its annular outer wall. When the upper and lower coupling members in the bayonet configuration are coupled, the tooth portions of the upper coupling member are located under the tooth portions of the lower coupling member to prevent the support from being drawn out from the base section. When actually using the fire extinguishing apparatus, however, the support and the base section may possibly rotate relatively and even be unexpectedly disengaged from each other to cause an accident. In order to avoid such trouble, an annular coupling retaining member with a plurality of projections or pawl portions at the lower portion thereof are fitted in the support so that the retaining member is urged downward. When the pawl portions are moved downward, they are allowed to advance into groove portions defined between the tooth portions of the upper coupling member. When the tooth portions of the upper and lower coupling members are caused to overlap each other in the aforesaid manner, therefore, the pawl portions of the coupling retaining member automatically enter the vertically overlapping groove portions adjacent to the tooth portions. Thus, the support and the base section can be securely coupled with ease in a short time without the possibility of unintended release or disengagement. This improved bayonet coupling system will further be explained in detail in connection with the following detailed description of the preferred embodiment of the invention.

This invention can be more fully understood from the following detailed description when taken in conjunction with the accompanying drawings, in which:

FIG. 2 is a sectional view showing details of a head block shown in FIG. 1;

Figure 1:
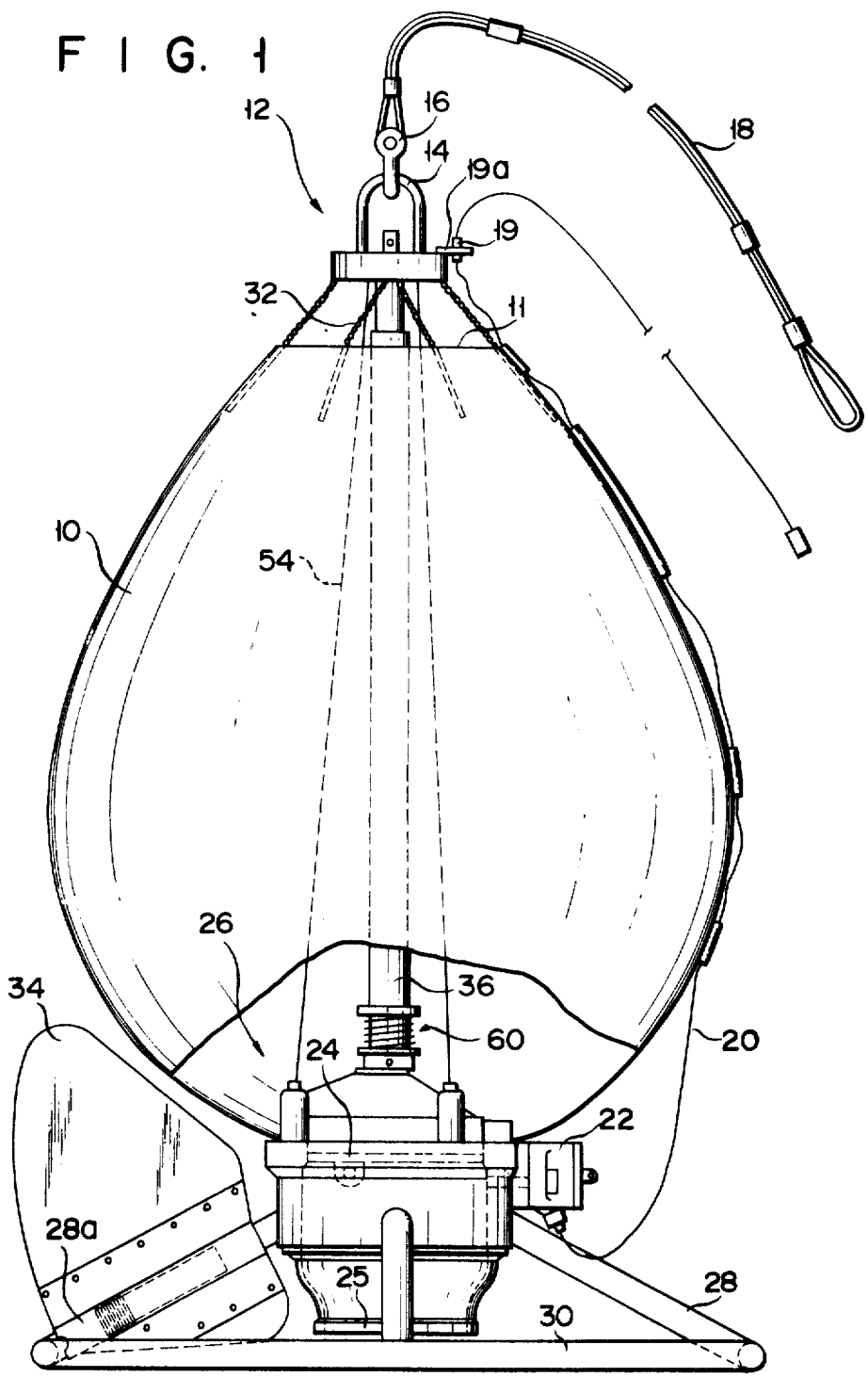
FIG. 1 is a partial sectional view of a fire extinguishing apparatus according to this invention.

FIG. 1 shows the fire extinguishing apparatus of the invention. A tank 10 injected with a fire-extinguishing agent through its upper opening 11 is carried to the scene of a fire, suspended from e.g. a helicopter (not shown) by means of a suspension wire 18 which is connected by means of a shackle 16 to a hanger ring 14 on a head block 12 connected with a plurality of wires 32 attached to the upper portion of the tank 10. At the scene of the fire, the fire-extinguishing agent is dropped onto the fire through an airdrop port 25 by driving an electromagnetic device 22 at the lower portion of the tank 10 to open a valve 24. The electromagnetic device 22 is driven by an external electric power source (not shown) with the aid of an electric wire 20 and a connector 19 fixed on a mounting plate 19a at the upper portion of the head block 12. A base section 26 including the valve 24 and the electromagnetic device 22 is hermetically attached to the bottom portion of the tank 10 so that the fire-extinguishing agent may be prevented from leaking. A ring-shaped pipe 30 is attached to the tip ends of a plurality of pipes 28 which extend obliquely downward from the base section 26. Capable of standing on its own bottom on the ground by the agency of the pipes 28 and 30 and a support 36 as mentioned later, the fire extinguishing apparatus of the invention can conveniently be allowed to stand while it is containing the fire-extinguishing agent, as well as while the tank 10 is being injected with the fire-extinguishing agent. The tank 10 is watertightly formed out of a flexible material such as synthetic rubber cloth. As shown in FIG. 2, the tip ends of the wires 32 attached to the upper portion of the tank 10 are fixed to a fitting ring 13 inside the head block 12. One pipe 28a among the pipes 28 is fitted with a direction stabilizing plate 34. The direction stabilizing plate 34 functions to orient the fire extinguishing apparatus in a substantially fixed direction with respect to the advancing direction of the helicopter when the apparatus is transported by air.

As shown in FIG. 1, the base section 26 is coupled with a pipe or the support 36 extending substantially perpendicularly. Such coupling is effected by an improved bayonet coupling method as mentioned later. A nut 38 is fixed inside the support 36 attached to the base section 26 by such coupling method, and a threaded portion at the lower end of an operating rod 40 is screwed in the nut 38. The head block 12 includes an upper cover 42 opening downward, a lower plate 44 attached to the skirt of the upper cover 42, and a middle plate 46 attached to the central portion of the under side of the upper cover 42. A guide pipe 48 hangs down from the lower plate 44. The operating rod 40 has a large-diameter portion 50 engaging the lower plate 44, and forms an operating head 52 which rotatably penetrates the head block 12 to be projected upward, thereby causing the operating rod 40 to rotate. As shown in FIGS. 1 and 2, a plurality of support wires 54 connecting the base section 26 and the head block 12 are disposed substantially at regular intervals around the support 36, the upper end of each support wire 54 being attached to the middle plate 46 by means of an end piece 56.

When the operating head 52 is rotated, the operating rod 40 rotates relatively to the nut 38, so that the head block 12 can move vertically as compared with the support 36 and hence the base section 26. When the head block 12 is raised, the highest position of the head block 12 is a position where the support wires 54 are stretched and strained. Thus, the position of the head block 12 depends on the length of the support wires 54, so that the shape of the tank 10 injected with the fire-extinguishing agent may be made substantially uniform for each fire extinguishing apparatus by previously unifying the length of the wires 54. When the operating rod 40 is rotated in the opposite direction to lower the head block 12, thereby loosening the support wires 54 and the wires 32, on the other hand, the head block 12 can be disengaged from the operating rod 40 without removing the wires 54 and 32. Thereafter, the support 36 is removed through the space between the wires 54 and 32, and the tank 10 can be folded up small.

Figure 6:
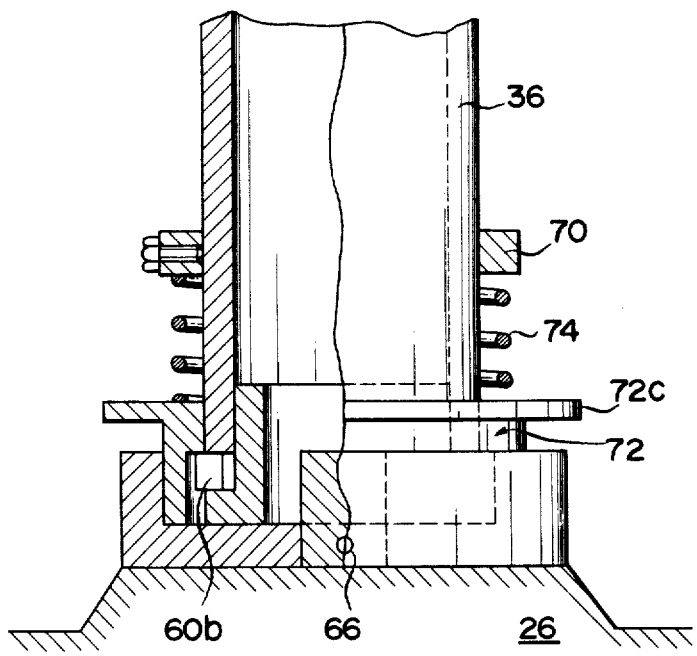
FIG. 6 is a partially sectional front view of the bayonet coupling mechanism of FIG. 1.

Now there will be described a bayonet coupling mechanism 60 as a means for coupling the support 36 with the base section 26. The bayonet coupling mechanism 60 (FIG. 1) includes an upper coupling member 62 as shown in FIGS. 3A and 3B and a lower coupling member 68 as shown in FIGS. 4A and 4B, as well as an annular flange 70 fitted and fixed on the outer circumference of the support 36, a coupling retaining member 72, and a spring 74 fitted on the support 36 between the flange 70 and the coupling retaining member 72, as shown in FIG. 6.

Figure 3A:
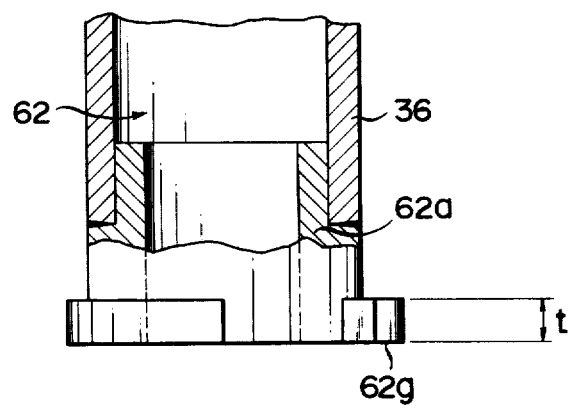
FIGS. 3A and 3B are a front sectional view and a top plan view of an upper coupling member of a bayonet coupling mechanism shown in FIG. 1, respectively.
Figure 3B:
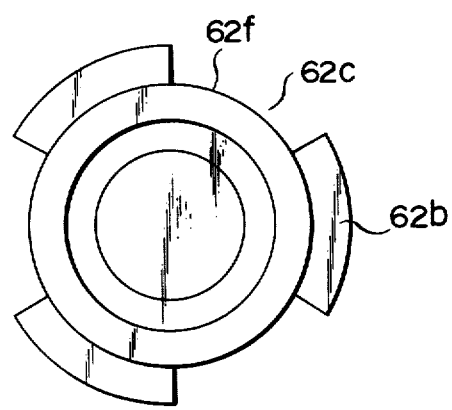

As shown in FIGS. 3A and 3B, the upper coupling member 62 consists of a cylindrical portion 62a fitted in the support 36 and tooth portions 62b outwardly protruding from the lower end of the cylindrical portion 62a at intervals of nearly 120° and each having an angular width of approximately 60° and a thickness t. A groove portion 62c is formed between each two adjacent tooth portions 62b.

Figure 4A:
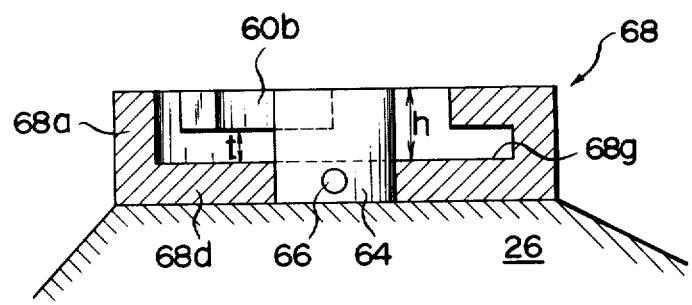
FIGS. 4A and 4B are a front sectional view and a top plan view of a lower coupling member of the bayonet coupling mechanism of FIG. 1, respectively.
Figure 4B:
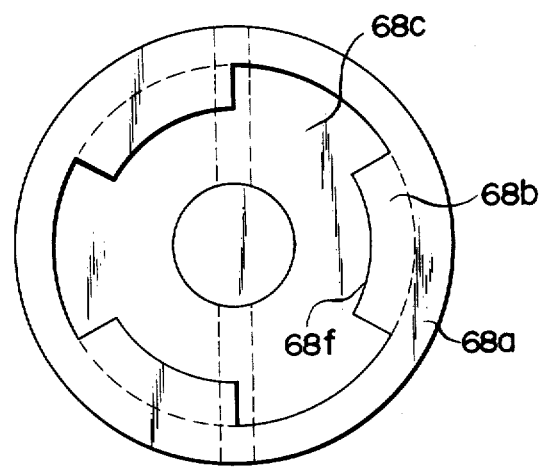

As shown in FIGS. 4A and 4B, the lower coupling member 68 is fitted on a projected portion 64 at the upper portion of the base section 26, and is fixed by means of a pin 66. The member 68 consists of a cylindrical portion 68a, a base plate 68d, and tooth portions 68b protruding from the inside of the upper portion of the cylindrical portion 68a toward the center at intervals of nearly 120° and each having an angular width of approximately 60°. A groove portion 68c is formed between each two adjacent tooth portions 68b, and the distance between the upper surface of the tooth portion 68b and the top surface of the base plate 68d is substantially equal to the thickness t. The outside diameter of the upper coupling member 52 corresponding to the tooth portions 62b is substantially equal to the inside diameter of the cylindrical portion 68a of the lower coupling member 68. Further, arcuate portions 62f defining the groove portions 62c of the upper coupling member 62 and arcuate portions 68f of the tooth portions 68b of the lower coupling member 68 have substantially the same radius.

Figure 5A:
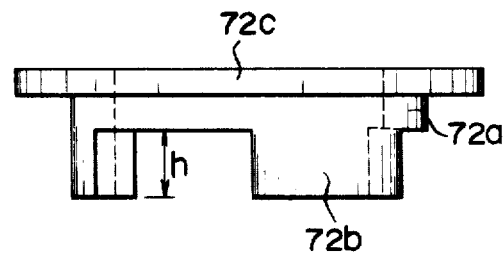
FIGS. 5A and 5B are a front view and a top plan view of a coupling retaining member used with the bayonet coupling mechanism of FIG. 1, respectively.
Figure 5B:
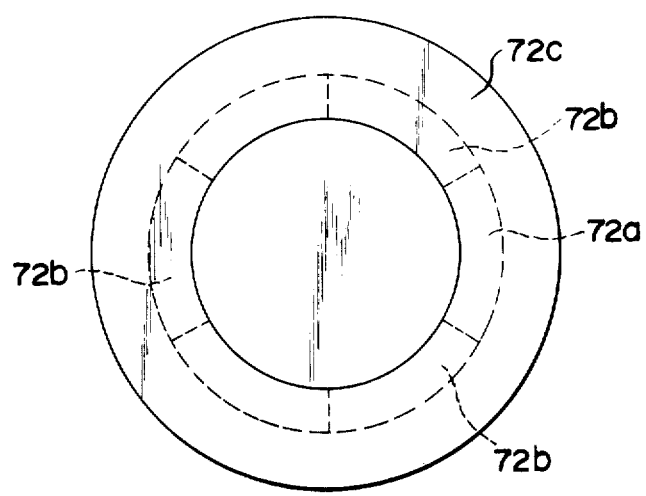

As shown in FIGS. 5A and 5B, the coupling retaining member 72 includes an annular portion 72a with its outside diameter substantially equal to that of the tooth portions 62b of the upper coupling member 62 and its inside diameter substantially equal to the outside diameter of the support 36, three pawl portions 72b perpendicularly protruding in the downward direction of FIG. 5A from the annular portion 72a at intervals of nearly 120° and each having an angular width of approximately 60°, and an operating portion 72c overlying the annular portion 72a. The vertical length h of the pawl portions 72b is substantially equal to the depth h of the groove portions 68c of the lower coupling member 68 shown in FIG. 4A. The outside diameter of the pawl portions 72b is substantially equal to the inside diameter of the cylindrical portion 68a of the lower coupling member 68, while the inside diameter of the pawl portions 72b is substantially equal to that of the arcuate portions 68f of the member 68. The coupling retaining member 72 is disposed at the lower end of the spring 74 the upper end of which is fixed to the flange 70 so that the pawl portions 72b may move toward the groove portions 62c of the upper coupling member 62. In coupling the support 36 and the base section 26, the tooth portions 62b and groove portions 62c of the upper coupling member 62 attached to the lower end of the support 36 are vertically opposed to the groove portions 68c and tooth portions 68b of the lower coupling member 68 mounted on the base section 26, respectively, and the member 62 is forced in so that the bottom face 62g of the member 62 abuts on the top surface 68g of the base plate 68d of the member 68. Then, the tooth portions 62b of the member 62 and the tooth portions 68b of the member 68 are caused to overlap each other by rotating the support 36 and hence the member 62 through an angle of approximately 60° in either direction. Thus, the members 62 and 68 are prohibited from moving up and down. In this state, the groove portions 62c of the member 62 and the groove portions 68c of the member 68 also overlap each other. Accordingly, the pawl portions 72b of the coupling retaining member 72 are automatically pushed into the groove portions 62c and 68c by the agency of the spring 74. As a result, the upper and lower coupling members 62 and 68 are prohibited from relative rotation, so that the support 36 and the base section 26 are securely couple without the possibility of natural removal or disengagement. FIG. 6 is a partial sectional view showing a state where the support 36 and the base section 26 are coupled, and the coupling retaining member 72 is pushed in the upper and lower coupling members 62 and 68 in the aforesaid manner.

The support 36 can be disengaged from the base section 26 by applying a force to the operating portion 72c on the annular portion 72a to push up the coupling retaining member 72 against the spring 74, thereby drawing out the retaining member 72 from the upper and lower coupling members 62 and 68, and then rotating the support 36 through an angle of approximately 60° with respect to the base section 26.

In the fire extinguishing apparatus, as described above, the support 36 and the base section 26 can be coupled with ease. More specifically, when the support 36 is fitted in the base section 26 and rotated through an angle of 60°, the coupling retaining member 72 is automatically lowered to lock the combination of the support 36 and the base section 26. In this case, the coupling between the support 36 and the base section 26 can be released only when the member 72 is removed against the biasing force of the spring 74. Such release can be easily achieved by pushing up the coupling retaining member 72 and rotating the support 36 relatively to the base section 26 as mentioned before. Unlike the prior art apparatus, therefore, the apparatus of this invention does not require any special operations to secure the coupling between the support 36 and the base section 26, such as the operations to drive in or remove the pin. This positively facilitates quick assembly of the fire extinguishing apparatus to cope with the occurrence of a fire.

What is claimed is:

1. A fire extinguishing apparatus for airdropping a fire-extinguishing agent, comprising:
    a tank made of a flexible material and containing said fire-extinguishing agent;
    a means including a valve for airdropping the fire-extinguishing agent in said tank;
    a means holding the upper end of said tank to suspend said tank;
    a support; the lower and upper ends of said support being coupled with said airdropping means and said suspending means, respectively; and
    a coupling mechanism for removably attaching the lower end of said support to said airdropping means,
    said coupling mechanism including:
    a bayonet-type upper coupling member attached to the lower end of said support and having a plurality of tooth portions protruding from the outer circumference thereof and groove portions formed between said tooth portions;
    a bayonet-type lower coupling member attached to the upper portion of said airdropping means and having a plurality of tooth portions protruding from the inner circumference thereof and groove portions formed between said tooth portions;
    a flange fixed around said support at the upper portion of said upper coupling member;
    a coupling retaining member having a plurality of pawl portions and fitted in said support under said flange and extending downward along the axial direction, said coupling retaining member being able to slide vertically along said support; and
    an elastic means disposed between said flange and said coupling retaining member, whereby said coupling retaining member is urged to move downward along said support,
    the pawl portions of said coupling retaining member entering the overlapping groove portions of said upper and lower coupling members to maintain the coupling between said two coupling members when said coupling members are coupled.

2. A fire extinguishing apparatus for airdropping a fire-extinguishing agent according to claim 1, wherein said means for airdropping the fire-extinguishing agent includes an electromagnetic device for operating said valve.

3. A fire extinguishing apparatus for airdropping a fire-extinguishing agent according to claim 2 further comprising a frame attached to said airdropping means to maintain a predetermined posture of said tank on the ground.

4. A fire extinguishing apparatus for airdropping a fire-extinguishing agent according to claim 3, wherein the support is constructed to be capable of axial expansion and contraction.

5. A fire extinguishing apparatus for airdropping a fire-extinguishing agent according to claim 4 further comprising a means for extending said support to a given length.

* * * * *